United States Patent [19]

Eguchi et al.

[11] Patent Number: 5,282,037
[45] Date of Patent: Jan. 25, 1994

[54] SUBCODE GRAPHICS REPRODUCTION CONTROL APPARATUS

[75] Inventors: Hiroyasu Eguchi; Yoichi Yamada; Tomohisa Tsukui, all of Tokorozawa, Japan

[73] Assignee: Pioneer Electronic Corporation, Tokyo, Japan

[21] Appl. No.: 17,815

[22] Filed: Feb. 16, 1993

[30] Foreign Application Priority Data

May 22, 1992 [JP] Japan .................. 4-130962

[51] Int. Cl.⁵ .......................... H04N 5/262
[52] U.S. Cl. .................. 358/182; 358/183; 358/22
[58] Field of Search .......... 358/183, 182, 22; 340/747, 721; H04N 9/74, 5/262, 5/272

[56] References Cited

U.S. PATENT DOCUMENTS

| | | | |
|---|---|---|---|
| 4,477,830 | 10/1984 | Lindman | 358/183 |
| 4,599,611 | 7/1986 | Bowker | 358/183 |
| 4,644,401 | 2/1987 | Gaskins | 358/183 |
| 5,214,512 | 5/1993 | Freeman | 358/183 |

FOREIGN PATENT DOCUMENTS 2241626 9/1991 United Kingdom .

Primary Examiner—Victor R. Kostak
Assistant Examiner—Sherrie Hsia
Attorney, Agent, or Firm—Perman & Green

[57] ABSTRACT

A subcode graphics reproduction control apparatus which can automatically execute fade operations between ordinary video images and graphics images. A memory for storing graphics data presenting particular images and transparency data defining transparency of the particular images is provided, the graphics data is read out in a subcode signal format from the memory according to a fade command and sent to a decoder, and with this operation a graphics video signal is generated. Also, the transparency data is read out from the memory according to a fade command, the transparency data value is gradually changed from a specified value in one direction, and a video signal input from outside and the graphics video signal output from the decoder are mixed at a mixing ratio corresponding to the transparency data. With the configuration as described above, fade operations to gradually fade out moving picture images and fade in graphics images or to gradually fade in moving picture images and fade out graphics images are automatically executed.

2 Claims, 13 Drawing Sheets

FIG. 2 PRIOR ART

| SYMBOL | R | S | T | U | V | W |
|---|---|---|---|---|---|---|
| 0 | MODE | | | ITEM | | |
| 1 | INSTRUCTION | | | | | |
| 2 | PARITY Q0 | | | | | |
| 3 | PARITY Q1 | | | | | |
| 4 | | | | | | |
| 5 | | | | | | |
| . | DATA FIELD | | | | | |
| . | | | | | | |
| . | | | | | | |
| . | | | | | | |
| 19 | | | | | | |
| 20 | PARITY | | | P0 | | |
| 21 | PARITY | | | P1 | | |
| 22 | PARITY | | | P2 | | |
| 23 | PARITY | | | P3 | | |

FIG. 3 PRIOR ART

PIXEL COLUMN: 0 1 2 3 4 5

PIXEL ROW: 0 1 2 . . . 10 11

FIG. 5 PRIOR ART

|     | R | S | T | U | V | W |                                      |
|-----|---|---|---|---|---|---|--------------------------------------|
| 1 = | 0 | 0 | 0 | 0 | 0 | 1 | :PRESET A MEMORY                     |
| 2 = | 0 | 0 | 0 | 0 | 1 | 0 | :PRESET A BORDER                     |
| 6 = | 0 | 0 | 0 | 1 | 1 | 0 | :WRITE A FOREGROUND/BACKGROUND FONTS |
| 20 = | 0 | 1 | 0 | 1 | 0 | 0 | :SOFT SCROLL SCREEN WITH PRESETTING |
| 24 = | 0 | 1 | 1 | 0 | 0 | 0 | :SOFT SCROLL SCREEN WITH COPYING    |
| 30 = | 0 | 1 | 1 | 1 | 1 | 0 | :CLUT READ COLOR 0 TO 7             |
| 31 = | 0 | 1 | 1 | 1 | 1 | 1 | :CLUT READ COLOR 8 TO 15            |
| 38 = | 1 | 0 | 0 | 1 | 1 | 0 | :EXCLUSIVE OR OF TWO COLORS FOR A FONT |
| 28 = | 0 | 1 | 1 | 1 | 0 | 0 | :SET UP A TRANSPARENCY              |

FIG. 6 PRIOR ART

| SYMBOL | R | S | T | U | V | W |
|---|---|---|---|---|---|---|
| 4 | 0 | 0 | COLOR | | | |
| 5 | 0 | 0 | REPEAT | | | |
| 6 | 0 | 0 | 0 | 0 | 0 | 0 |
| 7 | . | . | | | | . |
| . | . | . | | | | . |
| . | . | . | | | | . |
| . | . | . | | | | . |
| . | . | . | | | | . |
| 18 | . | . | | | | . |
| 19 | 0 | 0 | 0 | 0 | 0 | 0 |

FIG. 7 PRIOR ART

| SYMBOL | R | S | T | U | V | W |
|---|---|---|---|---|---|---|
| 4 | 0 | 0 | COLOR | | | |
| 5 | 0 | 0 | 0 | 0 | 0 | 0 |
| 6 | . | . | | | | . |
| . | . | . | | | | . |
| . | . | . | | | | . |
| . | . | . | | | | . |
| . | . | . | | | | . |
| 18 | . | . | | | | . |
| 19 | 0 | 0 | 0 | 0 | 0 | 0 |

FIG. 8 PRIOR ART

| SYMBOL | R | S | T | U | V | W |
|---|---|---|---|---|---|---|
| 4 | CH0 | | COLOR 0 | | | |
| 5 | CH1 | | COLOR 1 | | | |
| 6 | 0 | | ROW | | | |
| 7 | COLUMN | | | | | |
| 8 | Y | | | | | |
| . | | | FONT | | | |
| . | | | | | | |
| . | | | | | | |
| 18 | | | | | | |
| 19 | | | | | | Z |

FIG. 9 PRIOR ART

| SYMBOL | R | S | T | U | V | W |
|---|---|---|---|---|---|---|
| 4 | 0 | 0 | COLOR | | | |
| 5 | COPH | | 0 | | PH | |
| 6 | COPV | | PV | | | |
| 7 | 0 | 0 | 0 | 0 | 0 | 0 |
| . | . | . | . | . | . | . |
| . | . | . | . | . | . | . |
| . | . | . | . | . | . | . |
| . | . | . | . | . | . | . |
| . | . | . | . | . | . | . |
| . | . | . | . | . | . | . |
| 19 | 0 | 0 | 0 | 0 | 0 | 0 |

FIG.10 PRIOR ART

| SYMBOL | R | S | T | U | V | W |
|---|---|---|---|---|---|---|
| 4 | 0 | 0 | 0 | 0 | 0 | 0 |
| 5 | COPH | | 0 | | PH | |
| 6 | COPV | | | PV | | |
| 7 | 0 | 0 | 0 | 0 | 0 | 0 |
| ⋮ | ⋮ | ⋮ | ⋮ | ⋮ | ⋮ | ⋮ |
| 19 | 0 | 0 | 0 | 0 | 0 | 0 |

FIG.11 PRIOR ART

| SYMBOL | R | S | T | U | V | W | |
|---|---|---|---|---|---|---|---|
| 4, 5 | COLOR-0 | | | | | | |
| 6, 7 | COLOR-1 | | | | | | |
| 8, ⋮ | | | | | | | |
| ⋮ | | | RED | | | GR0 | } COLOR-n |
| ⋮ | GR1 | | | BLUE | | | |
| ⋮, 17 | | | | | | | |
| 18, 19 | COLOR-7 | | | | | | |

FIG.12 PRIOR ART

| SYMBOL | R | S | T | U | V | W |
|---|---|---|---|---|---|---|
| 4 | | | TRANS- 0 | | | |
| 5 | | | TRANS- 1 | | | |
| 6 | | | TRANS- 2 | | | |
| 7 | | | TRANS- 3 | | | |
| 8 | | | | | | |
| . | | | | | | |
| . | | | | | | |
| . | | | | | | |
| . | | | | | | |
| . | | | | | | |
| 17 | | | | | | |
| 18 | | | TRANS - 14 | | | |
| 19 | | | TRANS - 15 | | | |

SUBCODE GRAPHICS REPRODUCTION CONTROL APPARATUS

BACKGROUND OF THE INVENTION

1. Field of the Invention

This invention relates to a subcode graphics reproduction control apparatus designed to perform operations of generating a graphics video signal from a subcode signal obtained through playback of a recording medium, mixing the generated signal with a video signal input from outside, and supplying the mixed signal to an image display device.

2. Description of Background Information

In digital audio discs such as the Compact Disc (CD), the subcode is recorded in addition to digital audio signals recorded as the main code. The structure of the subcode is standardized as described below. The subcode contained in each frame of the main code is made up of 8 bits, and a bit group constituting one subcode block is divided into 8 channels of P, Q, R, S, T, U, V and W. Among these channels, the channel Q bit includes time information corresponding to a track length from the start position of a program area of the CD to a specified position of each information data recorded therein, and carries address time data available as positional data indicating the recording position. The channel P bit carries data including information of the pause between recorded music pieces. In a system where image information is recorded and reproduced in the form of the subcode as shown in FIG. 1, one symbol in the data corresponding to the image information consists of 6 bits from channel R to channel W, and 98 symbols are treated as one block. The first two of these 98 symbols are used as a synchronizing signal, and 24 symbols obtained by dividing the remaining 96 symbols to equal portions are treated as the minimum unit (PACK), and constitute one image processing instruction.

As shown in FIG. 2, each PACK has MODE and ITEM each comprising 3 bits, and the MODE and ITEM indicate a mode of the PACK. For instance ZERO mode is designated when MODE=000 and ITEM=000 and TV graphics mode is designated when MODE=000 and ITEM=001. Symbol 1 is set as INSTRUCTION, while symbols 4 to 19 are data fields. The INSTRUCTION defines characteristics of the data fields. The symbols 2 and 3 indicate a Q parity (Parity Q0, Q1), and are used to correct errors in symbol 0 or 1. The symbols 20 through 23 indicates a P parity (PARITY P0 through P3), and are used to correct errors in symbols 0 through 19.

In the TV graphics mode, the configuration of a TV screen is set up based on the unit designated as FONT. As shown in FIG. 3, one FONT comprises 6 pixels in the horizontal direction (column) and 12 pixels in the vertical direction (row), and a pixel is a minimal picture element which can be displayed. A SCREEN area which can be actually displayed on the TV screen is formed by 48 (in the horizontal direction)×16 (in the vertical direction) FONTs, and an area surrounding the SCREEN area is called BORDER area. A display memory for the TV screen consists of 50 (in the horizontal direction)×18 (in the vertical) FONTs, so that the total size is larger than that of the SCREEN area by one font in the upper and lower directions and in the right and left directions. Also a pointer is defined to realize soft scrolling. The horizontal screen pointer PH indicates a horizontal shift rate to horizontally displace all pixel data in the display memory, while the vertical screen pointer PV indicates a vertical shift rate to vertically displace all pixel data in the display memory.

For the TV graphics mode, instructions are defined as shown in FIG. 5. In the case of instruction 1 which is a display-memory preset instruction, the data area in the PACK has the configuration as shown in FIG. 6. All fonts in the display memory are preset to a color number specified by COLOR in symbol 4, and pointers PH and PV are reset to 0. In the case of instruction 2 which is a border-preset instruction, the data area in the PACK has the configuration as shown in FIG. 7, and the border area is preset to a color number specified by COLOR in symbol 4 for color. In the case of instruction 6 which is an instruction for writing foreground/background FONT, the data area in the PACK has the configuration as shown in FIG. 8. This command is to write font data in symbols 8 to 19 (color number data) at an address position defined by the ROW specified in symbol 6 and the COLUMN specified in symbol 7. In FIG. 8, Y indicates the top-left pixel in the FONT, while Z indicates the bottom right pixel in the font. A color having a color number specified by COLOR0 in symbol 4 is written as a foreground color for pixels having the font data of "0" and a color having a color number specified by COLOR1 in symbol 5 is written as a foreground color for pixels having the font data of "1", in both cases, in bit planes 0 to 3 of the display memory.

In the case of instruction 20 which is a scroll screen instruction with presetting, the data area in the PACK has the configuration as shown in FIG. 9. COPH in symbol 5 indicates the movement of font data in the display memory in the horizontal direction, while COPV in symbol 6 indicates the movement of font data in the display memory in the vertical direction.

In the case of instruction 24 which is a scroll screen instruction with copying, the data area in the PACK has the configuration as shown in FIG. 10. COPH in symbol 5 indicates the movement of font data in the display memory in the horizontal direction, while COPV in symbol 6 indicates the movement of font data in the display memory in the vertical direction.

In the case of instruction 30 which is a load CLUT COLOR 0 to 7 instruction, the data area in the PACK has the configuration as shown in FIG. 11. This command specifies 8 colors in the first half of the color look-up table which indicates which color among 16 colors corresponds to each of the aforesaid color numbers. In symbols 4 to 19, graphics RGB data specified by COLOR-0 to COLOR-7 is set, using 2 symbols for one color. In the case of instruction 31 which is a load CLUT COLOR 8 to 15 instruction, COLOR-8 to COLOR-15 are set, using 2 symbols for one color, to specify 8 colors in the second half of the color look-up table. The mixing of colors for each color number is such that the red color comprises 4 bits of channels R to U in an even number symbol assigned to one color number, the green color comprises 2 bits of the subsequent channels V and W and other 2 bits of the channels R and S in the next odd number symbol, and the blue color comprises 4 bits of the furthermore subsequent channels T to W. Since the gray scale is $2^4=16$ levels for each of three colors R, G, and B, so that $16^3=4096$ ways of color mixing are possible. In the gray scale, "0000" indicates the darkest state, and "1111" indicates the brightest state.

The instruction 38, which is an exclusive-or font instruction, is used to limit the color in a FONT written with two colors or one color according to the preset instruction or the foreground/background font write-in instruction up to 16 colors.

In the case of instruction 28 which is a transparency-set command, the data area in the PACK has the configuration as shown in FIG. 12. This command is used to set a mixing ratio when graphics image is mixed with moving pictures, and the mixing ratio is specified in the transparency look-up table indicating transparency of each of 16 colors defined in the color look-up table with TRANS-0 to TRANS-15 in symbols 4 to 19. With this instruction, the transparency of the color in all pixels can be specified with 6 bits to any of 64 stages, in which "000000" indicating the least transparent state and "111111" indicating the most transparent state.

Standards for subcode as described above are described in detail, for instance, in October, 1986 issue of "JAS Journal", a magazine published by the Japan Audio Association.

The subcode graphics reproduction control apparatus which generates a video signal indicating TV graphics image from subcode signals of TV graphics mode output from a disc player based on the subcode provided as described above is disclosed, for instance, in Japanese Patent Laid Open Publication No. 1-256060, and is well known. Also this type of apparatus has a superimposing function to synthesize graphics with moving pictures by means of mixing video signals output from a VTR (Video Tape Recorder) or a video disc player and indicating a moving picture or a still picture (simply called moving picture video signal hereinafter) with graphics video signals.

In prior art-based subcode graphics reproduction control apparatuses as described above, however, there has been an inconvenience that the fade operation cannot be carried out unless the attenuation degree is manually changed by the user.

OBJECT AND OUTLINE OF THE INVENTION

An object of the present invention is to provide a subcode reproduction control apparatus which enables automatic fade operations between a moving picture image and a graphics image.

The subcode graphics reproduction control apparatus according to the present invention is an apparatus configured to generate a graphics video signal from subcode signals obtained when a recording medium is replayed, mix the graphics signals with a video signal input from outside, and send the mixed signal to an image display; characterized in that said apparatus includes a command generating means for generating a fade command, a storage means for storing graphics data representing images and transparency data indicating transparency of the images, a first reading means for reading out graphics data from the storage means in a subcode signal form according to the fade command, a second reading means for reading transparency data from the storage means according to the fade command and gradually changing the transparency data value from a preset value in one direction to output the changed value, a decoding means for generating a graphics signal according to the graphics data in the read-out subcode signal format, and a mixing means for a mixing video signal input from outside with the graphics video signal output from the decoding means at a mixing ratio corresponding to the transparency data output from the second reading means to output the signals.

In the subcode graphics reproduction control apparatus according to the present invention, a storage means for storing graphics data representing images and the transparency data indicating transparency of the images is provided, the graphics data is read out in the subcode signal format from the storage means according to a fade command and sent to the decoding means, and with this operation a graphics video signal is generated. On the other hand, transparency data is read out from the storage means according to the fade command, the data is gradually changed from a specified value in one direction, and the video signal input from the outside and the graphics video signal output from the decoding means are mixed at a mixing ratio corresponding to the transparency data. Either one of an image based on the video signal element input from the outside and a graphics image gradually fade out, while the other one gradually becomes clearly displayed.

BRIEF DESCRIPTION OF THE DRAWINGS

FIG. 2 is a drawing illustrating structure in a PACK;
FIG. 3 is a drawing illustrating structure in a FONT;
FIG. 5 is a drawing illustrating types of instructions for TV graphics;
FIG. 6 is a drawing illustrating the structure of a data area in a PACK for a display memory preset instruction;
FIG. 7 is a drawing illustrating the structure of a data area in a PACK for a border preset instruction;
FIG. 8 is a drawing illustrating the structure of a data area in a PACK for the foreground/background write instruction;
FIG. 9 is a drawing illustrating structure of a data area in a PACK for the scroll screen instruction with presetting;
FIG. 10 is a drawing illustrating structure of a data area in a PACK for the scroll screen instruction with copying;
FIG. 11 is a drawing illustrating a data area in a PACK for the load CLUT COLOR 0 to 7 command;
FIG. 12 is a drawing illustrating structure of a data area in a PACK for the transparency set-up command.

BRIEF DESCRIPTION OF THE PREFERRED EMBODIMENT

Before entering into the description of a preferred embodiment of the present invention, an explanation will be made on a conventional subcode reproduction control apparatus.

Figure 1:
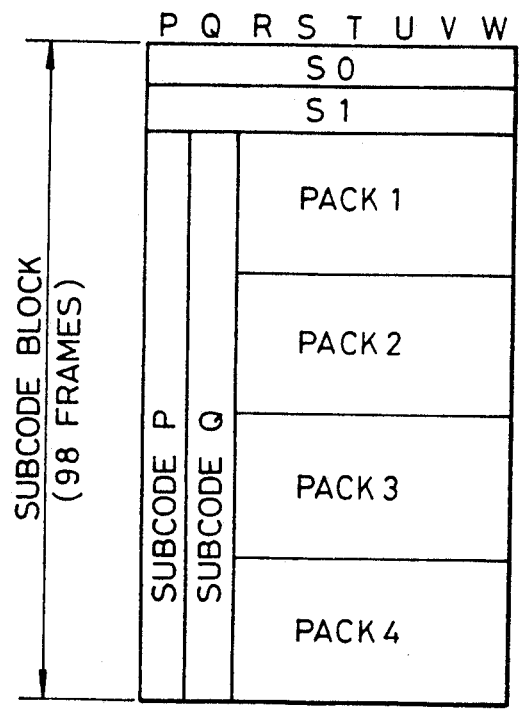
FIG. 1 is a drawing illustrating a subcode block.
Figure 4:
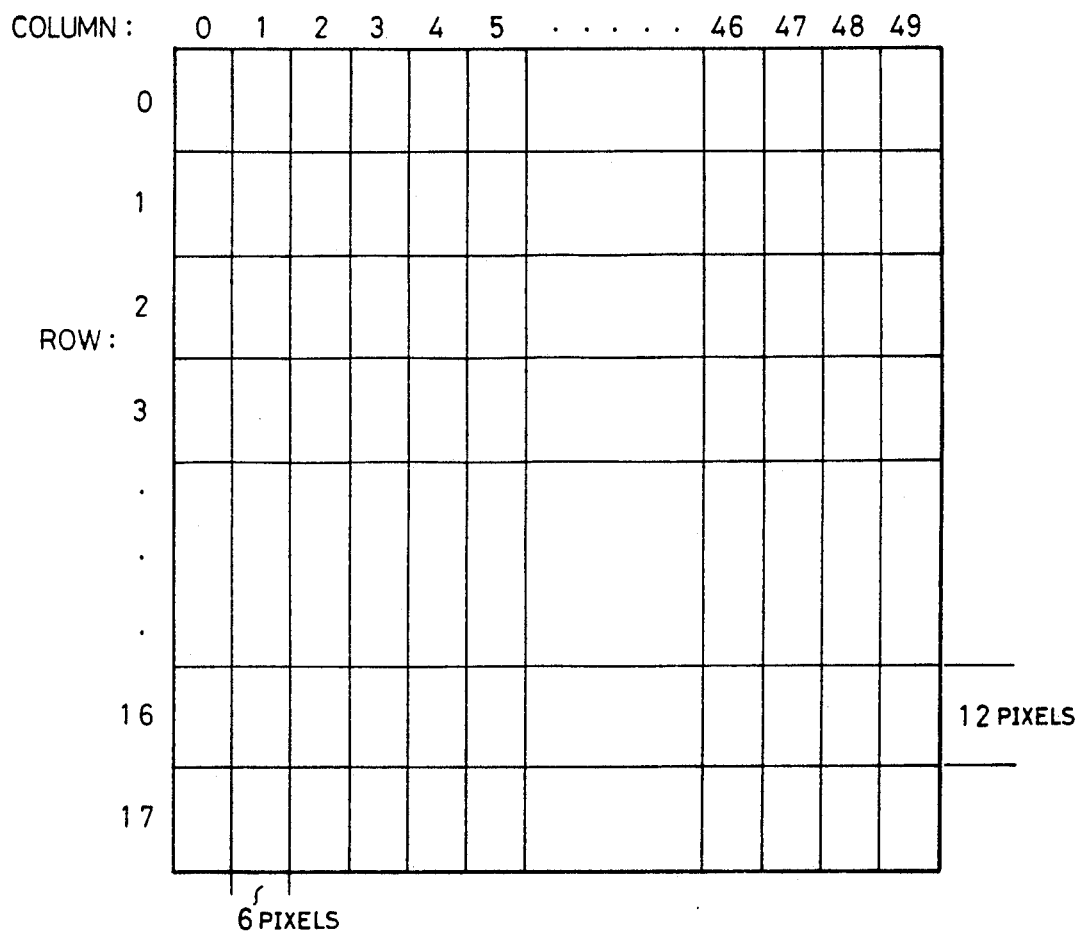
FIG. 4 is a drawing illustrating configuration of a display memory.
Figure 13:
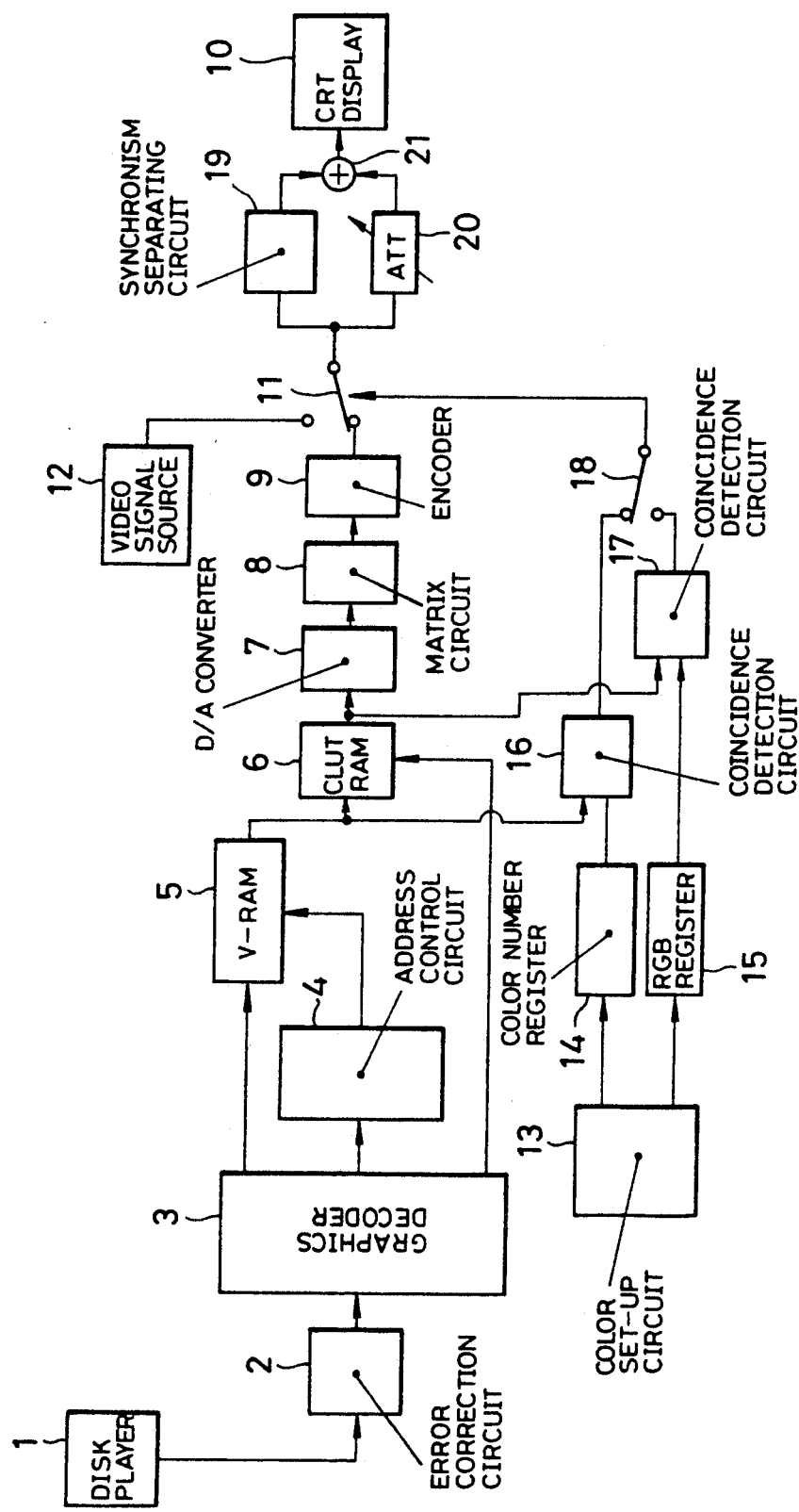
FIG. 13 is a block diagram of a conventional subcode reproduction control apparatus.
Figure 14:
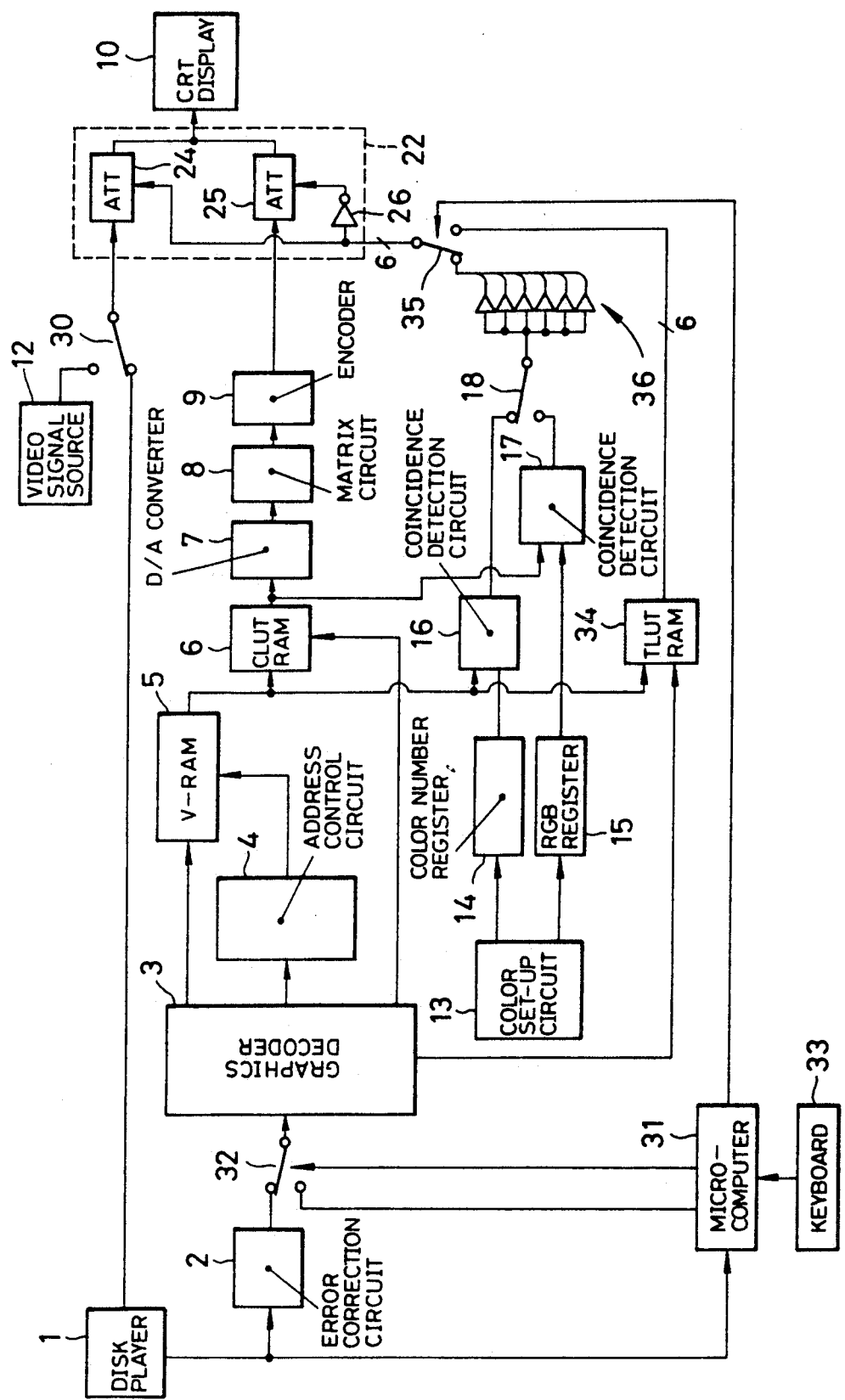
FIG. 14 is a block diagram of an embodiment of the present invention.

FIG. 13 shows the general configuration of a conventional subcode reproduction control apparatus having the superimposing function. In this types of control apparatus, a subcode signal obtained by processing a read signal from the disc in a disc player 1 is fed, and the subcode signal is sent via an error correction circuit 2 to a graphics decoder 1. The error correction channel 2 carries out de-interleave of 6 bits of channels R to W and correction of errors due to parity Q or P. A graphics decoder 3 interprets the graphics instruction of the error-corrected subcode signal. An instruction such as the font write-in instruction or data as font data as a result of the interpretation is set to any of an address control circuit 4, a V (video)-RAM 5, and a RAM 6 for the color look-up table according to a type of the data. It should be noted that, although only 3 lines are shown in FIG. 14 as output lines from the graphics decoder 3 for the purpose of simplification, actually the graphics decoder 3 is connected to the address control circuit 4, the V(video)-RAM 5 and the RAM 6 for the color look-up table with more output lines.

The address control circuit 4 sets up a write address according to a write-in command and also sets a read address according to various types of data such as COPH for scroll. The V-RAM is a display memory having at least a storage area corresponding to the screen area. The color look-up table (CLUT) RAM 6 has an area to store RGB data corresponding to color numbers for 16 colors. For instance, when a font write-in instruction of instruction 6 is interpreted by the decoder 3, and address of the V-RAM defined by a row and a column included as data in the command is designated from the address control circuit 4, and the color number data as font data is written at a storage position having the designated address. Font data read from the V-RAM 5 is carried out at a timing according to a vertical synchronization signal and a horizontal synchronization signal, and RGB data for the corresponding color number is read from the RAM 6 according to the read font data. The vertical synchronization signal and the horizontal synchronization signal as described above are obtained, during the superimpose operation, from a video signal source 12 described later. The RGB data is converted to an analog RGB signal by a D/A converter 7, and then converted to an illumination signal Y, color difference signals R - Y and B - Y. Furthermore, signals output from a matrix circuit 8 are converted to a graphics video signal which is a composite video signal. On the other hand, when the decoder 3 interprets a load CLUT COLOR 0 to 7 instruction of instruction 30 or a load CLUT COLOR 8 to 15 instruction of instruction 31 from the input subcode signal, the data stored in the CLUT RAM 6 is rewritten, so that a designated color for each color number is varied.

The graphics video signal output from an encoder 9 is sent to a switch 11. The switch 11 outputs either a graphics video signal or a moving picture video signal from the video signal source such as a VTR selectively according to a switch signal which is described later.

A color set-up circuit 13 comprises a memory (not shown) in which a plurality of color number data and RGB data corresponding to the color number data are stored and a read circuit (not shown) to selectively read out one piece of color number data from the plurality of data as well as RGB data corresponding to the color number data according to the operation. The read color number data is maintained in a register 14 and the RGB data is stored in a register 15. A coincidence detecting circuit 16 is connected to an output terminal of the register 14, and the coincidence detecting circuit 16 detects coincidence between the color number data read out from the V-RAM 5 and the color number data being maintained in the register 14. A coincidence detecting circuit 17 is connected to an output terminal of the register 15, and the coincidence detecting circuit 17 detects coincidence between the RGB data read out from the CLUT RAM 6 and the RGB data being maintained in the register 15. The coincidence detecting circuits 16 and 17 generates a switch signal when coincidence is detected. A switch 18 is connected to each output terminal of the coincidence detecting circuits 16 and 17. The switch 18 is automatically or manually switched according to a disc being replayed, selects either one of the output signals from the coincidence detecting circuits 16 or 17, and sends the signal to the switch 11. For this reason, when the switch 18 has selected the coincidence detecting circuit 16, if the color number data for a color specified in an operation coincides with the color number data read out from the V-RAM 5, a switch signal is sent from the coincidence detecting circuit 16 via the switch 18 to the switch 11, and the moving picture video signal from the video signal source is output from the switch 11 in place of the graphics video signal output from the encoder 7. On the other hand, when coincidence between the color number data and the color number data read out from the V-RAM 5 is lost, generation of the switch signal is stopped, and the graphics video signal output from the encoder 7 is relayed and output from the switch 11 in place of the moving picture video signal from the video signal source 12. When the video signal output from the switch 11 is sent to a CRT display 10, an image in which the graphics image has been inserted into the moving picture image, namely a superimposed image is obtained on a screen of the CRT display 10. A similar operation is carried out also when the switch 18 selects the coincidence detecting circuit 17.

The subcode graphics reproduction control apparatus shown in FIG. 13 has a fade control function to gradually and clearly display an image and then gradually fade out the image. For this reason a selection output from the switch 11 is not directly connected to the CRT display 10. A synchronization separating circuit 19, an ATT 20, and an adder 21 are sections provided for the fade-in/fade-out control function. The video signal output from the switch 11 is sent to the synchronization separating circuit 19 and the ATT 20. The synchronization separating circuit 19 extracts only a synchronization signal element in the video signal. The attenuation degree in the ATT 20 can manually be changed, and the video signal level changes according to the adjustment. The synchronization signal element from the synchronization separating circuit 19 and a video signal from the ATT 20 are added by an adder 21 and then sent to the CRT display 10. With this scheme, a level of video signals output from the ATT 20 can be changed so that an image on a screen of the CRT display 10 will become clearer or fade out by manually changing the attenuation degree in the ATT 20. For instance, when the attenuation degree in the ATT 20 is gradually decreased by means of manual operation, a level of video signals output from the ATT 20 gradually raises, the fade-in operation is carried out, namely an image gradually becomes clearer and clearer on the screen of the CRT display 10. When the attenuation degree in the ATT 20 is gradually increased, a level of video signals output from the ATT 20 gradually becomes lower and lower, and the fade-out operation is carried out, namely an image on a screen of the CRT display gradually fades out.

In the conventional subcode graphics reproduction control apparatuses described above, however, unless the attenuation degree in the ATT 20 is manually changed, the fade operation cannot be carried out, as mentioned before.

Detailed description is made for a preferred embodiment of the present invention.

FIG. 14 shows a subcode graphics reproduction control apparatus according to the present invention. In FIG. 14 showing this subcode graphics reproduction control apparatus, the same reference numerals are used to denote the same elements as those in the subcode graphics reproduction control apparatus shown in FIG. 13. A playing apparatus which can play a so-called LDD video disc with a subcode signal recorded therein is used as the disc player 1. This disc player 1 extracts main code signals and subcode signals by processing signals read from a disc, and further decodes the main code signals to get a composite video signal as a moving picture video signal.

The subcode signals are sent to the error correction circuit 2 as well as to the microcomputer 31. Subcode signals output from the error correction circuit 2 are sent via a switch 32 to the graphics decoder 3. The microcomputer 31 has a microprocessor, a memory comprising a ROM and a RAM, and an input/output interface (both not shown). A program and data are written in the ROM beforehand. The data includes a preset instruction data signal for instruction 1 defining an image with a particular color and a transparency set-up instruction data signal for instruction 28, and the signals have the same format as that of the graphics subcode signal. The switch 32 selectively sends the subcode signal output from the error correction circuit 2 and the graphics data signals output from the microcomputer 31 to the graphics decoder 3, and the selection is made according to a selection signal from the microcomputer 31. A microprocessor of the microcomputer 31 reads a graphics signal from the ROM according to a program, output the signal, and also outputs switching signals.

Color number data read out from the V-RAM 5 is sent to the CLUT RAM 6, coincidence detecting circuit 16, and a transparency look-up table (TLUT) RAM 35. The TLUT RAM 34 has a storage capacity of 6 bits×16, and can store in it transparency data which is specified for each of the 16 colors in 64 stages. When color number data is sent from the V-RAM 5 to the TLUT RAM 34, transparency data corresponding to the color number data is read out. The transparency data stored in the RAM 34 is set to the decoder 3 and written therein when the graphics decoder 3 interprets the data as the transparency set-up instruction. The 6-bit transparency data output from the TLUT RAM 34 is sent via a switch 35 to a mixing circuit 22. The output of selection by the switch 18 is sent via a 6-bit converting circuit 36 to the switch 35. The 6-bit converting circuit 36 comprises 6 buffers, and converts 1-bit output from the coincidence 16 or 17 to 6-bit output indicating that coincidence was detected. Either one of the 6-bit output indicating detection of coincidence and transparency data is selectively sent to the mixing circuit 22 by the switch 35. Selection switching by the switch 35 is made according to a switch signal from the microcomputer 31.

The moving picture video signal output from the disc player 1 is sent via a switch 30 to the mixing circuit 22. The switch 30 selectively sends the moving picture video signal output from the video signal source 12 and moving video signal output from the disc player 1 to the mixing circuit 22 according to the manual operation. The mixing circuit 22 comprises an ATT 24 which attenuates the moving picture video signal from the switch 30, an ATT 25 which attenuates the graphics video signal from the encoder 9, and an invertor 26 which inverts the transparency data read out from the RAM 34 or the 6-bit output indicating detection of coincidence from the 6-bit converting circuit 36. The attenuation degree in the ATT 24 changes according to the transparency data read out or output concerning detection of coincidence, while the attenuation degree in the ATT 25 changes according to data inverted by the invertor 26. Signals output from the ATTs 24 and 25 are sent to the CRT display 10. Of the graphics images, to a color the transparency of which is specified at a high level by the transparency data in the transparency look-up table, the attenuation degree in the ATT 24 becomes smaller and the moving picture video signal is attenuated a little, while the attenuation degree in the ATT 25 becomes larger and the graphics video signal from the encoder 9 is largely attenuated. Reversely, of the graphics images, to a color the transparency of which is specified at a lower by the transparency data in the transparency look-up table, the attenuation degree in the ATT 24 becomes larger and the moving picture video signal from the disc player 1 is largely attenuated, while the attenuation degree in the ATT 25 becomes smaller and the graphics video signal from the encoder 9 is attenuated a little. As a result, the higher the transparency is, the higher the overlaying degree between the moving picture and the graphics image is. It is to be noted that each of the ATT 24 and ATT 25 comprises a VCA (voltage control amplifier) provided in the video signal line and a D/A convertor which converts data such as transparency data to analog signals and sends as control voltage to the VCA. With the configuration described above, when a subcode signal is sent via the error correction circuit 2 and the switch 32 to the graphics decoder 3, the decoder 3 interprets the graphics instruction in the subcode signal depending on contents of symbol 1. For instance, if the decoder interprets the instruction as the preset instruction in instruction 1, color number data specified by COLOR in symbol 4, a column signal, and a row signal to successively specify all pixels in the screen area are generated. The column signal and the row signal are sent to the address control circuit 4, and the address control circuit 4 computes the write address as data according to the column signal and the row signal, and the write address data is successively sent to an address terminal of the V-RAM 5. With this operation, data having the same color number is written at memory positions specified by all addresses in the V-RAM 5. Also, if the decoder 3 determines that the graphics instruction is the foreground-/background font write-in instruction in instruction 6, the decoder sends the write-in signal to the V-RAM 5, and sends a column signal and a row signal which specify pixels for one font based on ROW and COLUMN in symbols 6 and 7 to the address control circuit 4. Also color number data specified by COLOR0 in symbol 4 or COLOR1 in symbol 5 is generated according to "0" or "1" in each pixel in font data for symbols 8 through 19 respectively, and the data is sent to the V-RAM 5. The address data control circuit 4 successively computes write address data for one font according to a column signal and a row signal, and successively sends the write address data to an address terminal of the V-RAM 5. With this, data at a memory position for one font in the V-RAM 5 is updated according to the new color number data.

When the decoder 3 determines that the graphics instruction is the load CLUT COLOR 0 to 7 command in instruction 30, the write signal is sent to the RAM 6, and the decoder 3 successively outputs 3×4 bit graphics RGB data for 8 colors according to COLOR0 to COLOR7 in symbols 4 through 19. At memory positions specified according to the order of colors in the RAM 6, the RGB data is written according to the write signal, and the color look-up table is formed. The similar operation is carried out also when the decoder 3 determines that the graphics instruction is the load CLUT COLOR 8 to 16 instruction in instruction 38.

When the decoder 3 determines that the graphics instruction in a subcode signal from the disc player 1 is the transparency set-up instruction in instruction 28, the decoder 3 sends a write signal to the RAM 34, and outputs 6-bit transparency data according to TRANS-0 to TRANS-15 in symbols 4 to 19. At the memory positions specified according to the order of colors in the RAM 34, a transparency look-up table with transparency written therein is formed according to a write signal.

The address control circuit 4 sets up read addresses when a write signal is not being sent from the graphics decoder 3. The read addresses synchronize to vertical and horizontal synchronization signals and are successively set up at a predetermined timing. It should be noted that, when the graphics instruction is the scroll screen instruction, the read addresses are computed according to values of PH, PV, COPH, and COPV each described above. If the scroll screen command is not used, the read addresses are set up successively from an address corresponding to the top left pixel on the screen. 4-bit color number data is read out from a memory position specified by the read address in the V-RAM 5. This 4-bit color number data is sent to the RAM 34, RAM 36, and coincidence detection circuit 16, and graphics RGB data with a color tone corresponding to the color number data is read from the RAM 6 according to the color look-up table. Also, transparency data corresponding to the color number data is read out from the RAM 34 according to the transparency look-up table.

The read graphics RGB data is converted by the D/A converter 7 to an analog graphics RGB signal, and then converted by the matrix circuit 8 and the encoder 9 to a graphics video signal. On the other hand, the read transparency data is sent via the switch 35 to the mixing circuit 22. The mixing circuit 22 mixes the moving picture video signal from the disc player 1 with the graphics video signal at a mixing ratio corresponding to the transparency data in the ATT 24 and ATT 25. Accordingly, if the transparency data is "000000" indicating an opaque state, the attenuation degree in the ATT 25 becomes lowest while that in the ATT 24 becomes highest and the graphic video signal is output, as it is, from the mixing circuit 22. If the transparency data is "111111" indicating a completely transparent state, the attenuation degree in the ATT 25 becomes highest while that in the ATT 24 becomes lowest, and moving picture video signal is output, as it is, from the mixing circuit 22. The video signal output from the mixing circuit 22 is sent to the CRT display 10 as an image display, and on a screen of the CRT display 10 is displayed, for instance, an image synthesized by adding a graphics image to a moving picture.

The above-described operations are carried out in an overlay state where transparency data from the RAM 34 has been selected, but in the superimpose function state where output for detection of incidence from the 6-bit converting circuit has been selected, the same operation as that in the conventional circuit as shown in FIG. 13 is carried out.

Figure 15:
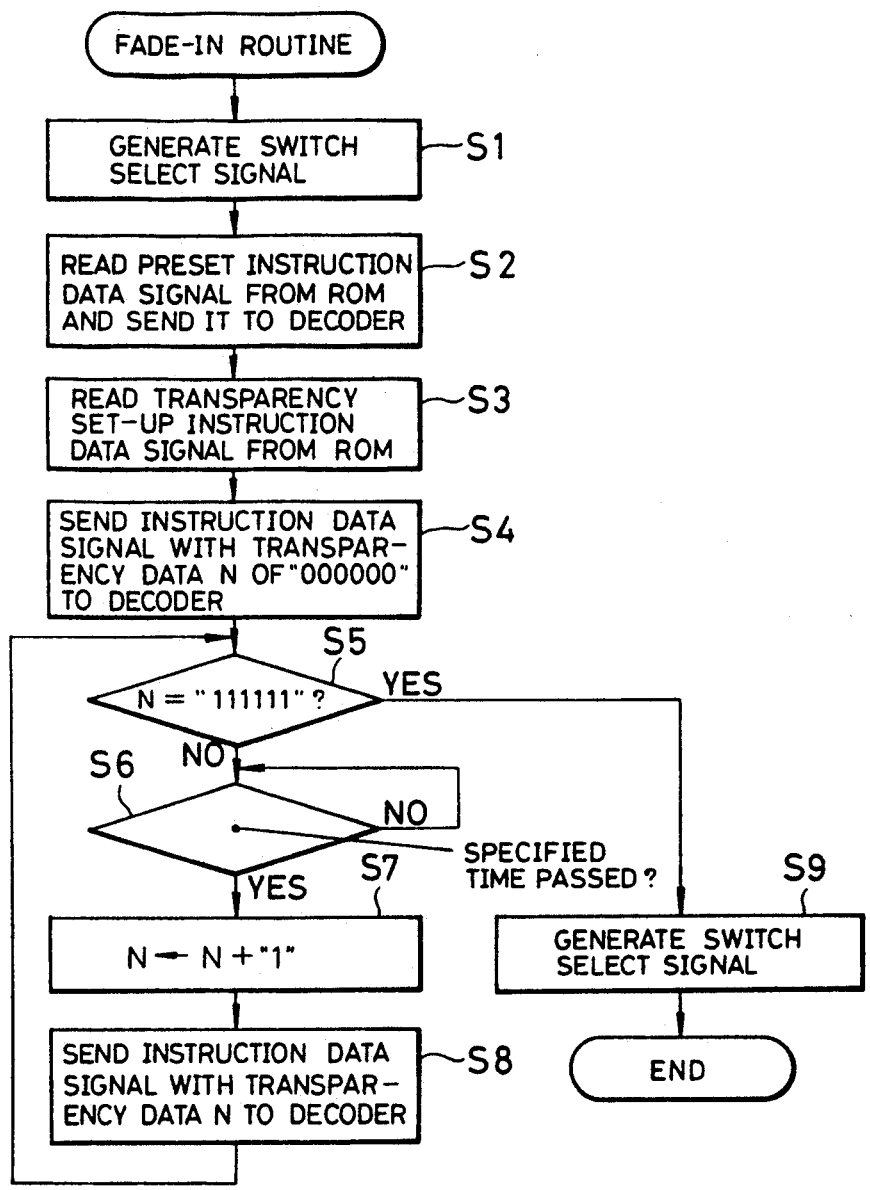
FIG. 15 is a flow chart of a fade-in routine carried out by a microcomputer according to the present invention.

Next, description is made below for the fade control function. At first, in the fade-in operation, a microprocessor in the microcomputer 31 generates a switch signal to the switches 32 and 35, as shown in FIG. 15, when a fade-in command is generated upon a key operation on a keyboard 33 (step S1). In response to this switch signal, the switch 32 relays signals output from the microcomputer 31 to the graphics decoder 3, and also the switch 35 enters the state where said switch replays the transparency data output from the TLUT RAM 34 to the mixing circuit 22. Then, a preset instruction data signal in instruction 1 is read from the ROM and sent via the switch 32 to the graphics decoder 3 (step S2). The graphics decoder 2 determines that the sent graphics instruction is the preset instruction in instruction 1, so that color number data specified by COLOR in symbol 4 is written at memory positions specified by all addresses in the V-RAM 5. This preset instruction data signal has the same color number data for an entire screen. However, also a graphics image having a plurality types of color number data may be formed by using the font write instruction in instruction 6.

Also, the microprocessor reads out transparency set-up instruction data signals in instruction 28 from the ROM (step S3), and sends all transparency data N for all of TRANS-0 to TRANS-15 in symbols 4 to 19 included in the transparency set-up instruction data signals as those indicating that N="000000" in an opaque state via the switch 32 to the graphics decoder 3 (step S4). It should be noted that only the transparency data corresponding to the same color number data described above may be defined as "000000" indicating an opaque state. The graphics decoder 3 determines that the sent graphics instruction is the transparency set-up instruction in instruction 28, sends a write signal to the TLUT RAM 34, and outputs 6-bit transparency data "000000" according to TRANS-o to TRANS-15 in symbols 4 to 19. The transparency data "000000" is written at memory positions specified according to the order of color numbers in the RAM 34 according to the write signal. As a result, the attenuation degree in the ATT 25 becomes lowest and that in the ATT 24 becomes highest according to the transparency data N output from the TLUT RAM 34, and the graphics video signal indicating an image with a particular color is output, as it is, from the mixing circuit 22. Then, the moving picture video signal output from the disc player 1 is not output from the ATT 24.

After execution of step S4, the microprocessor judges whether the transparency data N is "111111" indicating a completely transparent state or not (step S5). If N is not "111111", the microprocessor judges whether a specified time (for instance, 32 milliseconds) has passed after execution of step 4 or step 8 which is described later or not (step S6), and if the specified time has passed, "1" is added to the transparency data N for TRANS-0 to TRANS-15 in symbols 4 to 19 included in the transparency set-up instruction data signals (step S7), and the transparency set-up instruction data signal including the transparency data N with "1" added thereto is sent to the graphics decoder 3 (step S8). After execution of step S8, the program proceeds to step S5. By repeating the operation as described above, a transparency degree of the transparency data N output from the TLUT RAM 34 once for every specified period of time becomes higher step by step. Namely, the attenuation degree in the ATT 25 becomes higher and that in the ATT 24 becomes smaller once for every specified period of time. With this operation, a level of a moving picture video signal in a signal output from the mixing circuit 22 gradually becomes larger, and a level of a graphics video signal element indicating an image with a particular color becomes smaller, so that the moving picture displayed on a screen of the CRT display 10 gradually becomes clearer.

In step S5, if N is "111111", the attenuation degree in the ATT 25 becomes highest, and that in the ATT 24 becomes lowest, which means that the moving picture video signal was output, as it was, from the mixing circuit 22. The microprocessor generates a switch signal to the switch 32 (step S9), and graphics control is carried out according to a subcode signal from the disc player 1. It should be noted that, after execution of step S9, the switch 35 is appropriately switched according to a type of disc. Namely, the switching control is carried out so that, for instance, output side from the TLUT RAM 34 is selected in case of an LDD disc and coincidence detection output side is selected in case of a CD disc.

In the embodiment described above, the fade-in operation is started according to a keyboard operation, but the fade-in command may be generated earlier by a specified time before disc play is actually started according to a command for starting disc play by the disc player 1.

Figure 16:
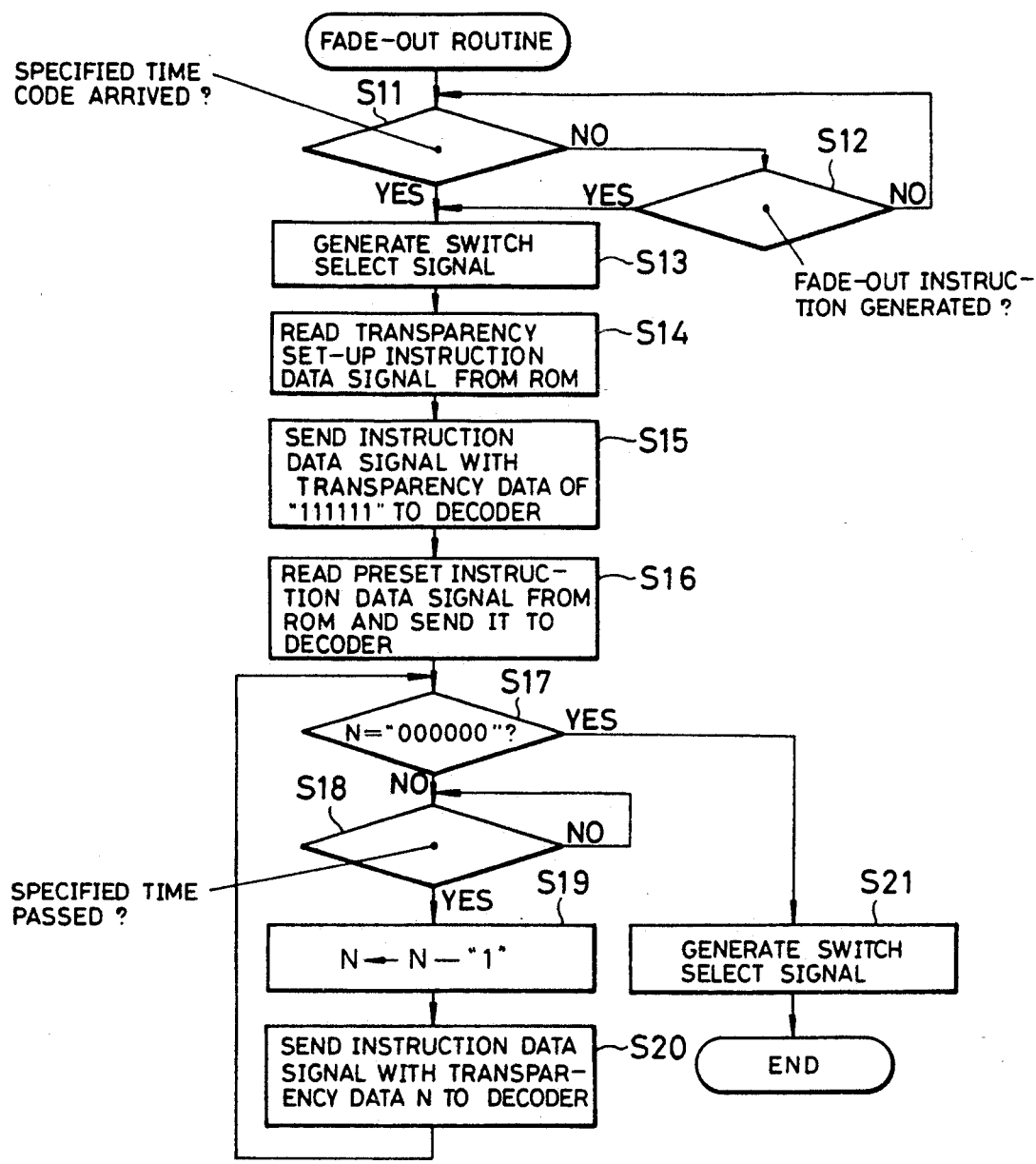
FIG. 16 is a flow chart of a fade-out routine carried out by a microcomputer according to the present invention.
Figure 17:
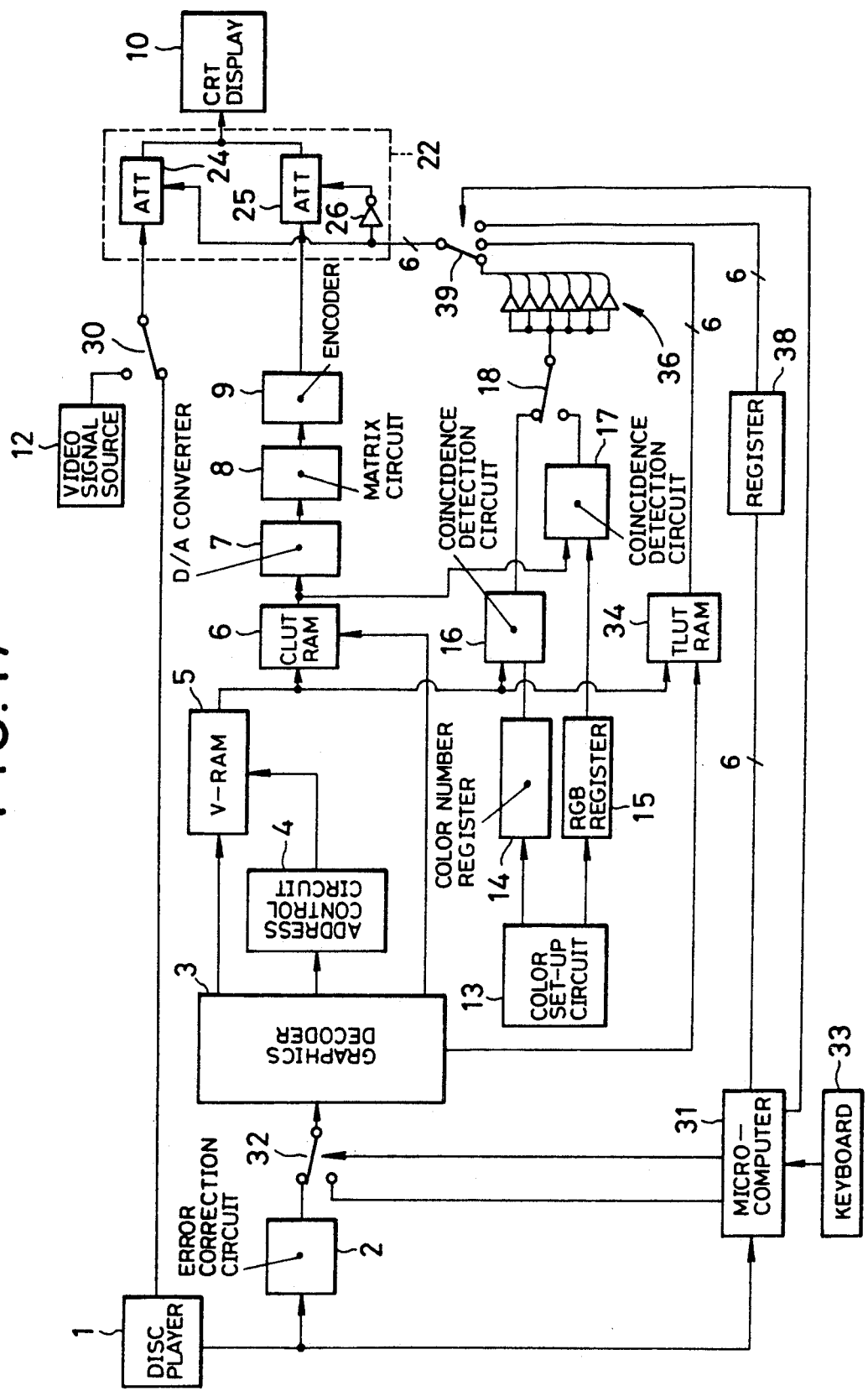
FIG. 17 is a block diagram of another embodiment of the present invention.

In a fade-out operation, the microprocessor in the microcomputer 31 judges, as shown in FIG. 16, whether specified time code has arrived according to a channel Q bit in a subcode signal sent from the disc player 1 or not (step S11). This specified time code indicates a time earlier by a specified period of time before time code indicating an end of each tune, for instance, in case of a video program for Karaoke (the accompaniment with a video image for people to sing a song for amusement). As the time code indicating an end of each tune is obtained by reading TOC (Table of Contents) of the disc before start of the next music piece, the specified time code can be computed as a value by subtracting a specified period of time from the time code indicating an end of the previous music piece. If the specified time code does not come, whether a fade-out command has been generated or not is determined by means of key operation on the keyboard 33 (step S12). When the specified time code arrives, or when the fade-out command is generated, a switch signal is generated to the switches 32 and 35 (step S13). According to the switch signal, the switch 32 relays a signal output from the microcomputer 31 to the graphics decoder 3, while the switch 35 relays transparency data output from the TLUT RAM 34 to the mixing circuit 22.

The microprocessor reads a transparency set-up instruction data signal in instruction 28 from the ROM (step S14), and sends transparency data N for all of TRANS-0 to TRANS-15 in symbols 4 to 19 included in the transparency set-up instruction data signal as "111111" indicating a completely transparency state via the switch 32 to the graphics decoder 3 (step S15). The decoder 3 determines that the sent graphics instruction is the transparency set-up instruction in instruction 28, sends a write signal to the TLUT RAM 34, and outputs 6-bit transparent data "111111" according to TRANS-0 to TRANS-15 for symbols 4 to 19. The transparency data "111111" is written according to the write signal at memory positions specified according to the order of color numbers in the RAM 34. For this reason, the attenuation degree in the ATT 25 becomes highest according to the transparency data N output from the TLUT RAM 34, while that in the ATT 24 becomes lowest, and output moving picture video signals from the disc player 1 are output, as they are, from the mixing circuit 22.

Then, the preset command data signal in instruction 1 is read from the ROM, and is sent via the switch 32 to the graphics decoder 3 (step S 16). The graphics decoder 3 determines that the sent graphics instruction is the preset command for instruction 1, so that, as described above, the color number data specified by COLOR in symbol 4 is written at specified memory positions with all addresses in the V-RAM 5.

After execution of step S16, the microprocessor determines whether the transparency data N is "000000" indicating an opaque state or not (step S17). If N is "000000", the microprocessor determines whether a specified time (for instance, 32 msec) has elapsed from execution of step 17 or step 20 which is described later (step 18), and if the specified time has elapsed, "1" is subtracted from the transparency data N for TRANS-0 to TRANS-15 in symbols 4 to 19 included in the transparency set-up instruction data signal (step S19), ant the transparency set-up instruction data signal including the transparency data N with "1" subtracted therefrom is sent to the graphics decoder 3 (step S20). After execution of step S20, control moves to step 18. Each time the operation as described above is repeated, opaqueness indicated by the transparency data N output from the TLUT RAM 34 once for every specified period of time becomes higher by 1 step. Namely, the attenuation degree in the ATT 25 becomes smaller and that in the ATT 24 becomes larger by one step once for every specified period of time. With this operation, the level of a moving picture signal element in the signal output from the mixing circuit 22 gradually becomes smaller, while the level of a graphics video signal element indicating an image with a particular image gradually becomes larger, so that moving picture images gradually fade out from a screen of the CRT 10, while an image with a particular color gradually becomes clearer.

N="000000" in step S17 indicates that the attenuation degree in the ATT 25 is the smallest and that in the ATT 24 is the largest, which means that a graphics video signal indicating an image with a specified particular color has been output, as it is, from the mixing circuit 22. The microprocessor generates a switch signal to the switch 32 (step S21), and with this operation graphics control is carried out according to subcode signals from the disc player 1.

It should be noted that, although in the embodiment of the present invention a fade-out operation is started when it is determined in step S11 that the specified time code has arrived, the fade-out operation may be started only when the fade-out command is generated upon a key operation on the keyboard 33.

Also in the fade-in and fade-out operations described above, transparency data is output as the transparency set-up instruction in instruction 28 from the microcomputer 31, the transparency data in TLUT RAM 34 is updated by the instruction, and transparency data corresponding to the color number data read out from the V-RAM 5 is output from the TLUT RAM 34 and sent to the mixing circuit 22, but also a configuration wherein fade-in and fade-out operations are carried out without using the TLUT RAM 34 can be employed. For instance, 6-bit transparency data may directly be output from the microcomputer 31 and stored by a register 38 so that the transparency data stored in the register 38 is sent via a switch 39 to the mixing circuit 22. In this case, the switch 39 is switched to the output side of the register 38 when a fade-in or fade-out instruction is generated, and the transparency data in the register 38 is updated according to output from the microcomputer 31 once for every specified period of time like in the operations shown in FIG. 15 and FIG. 16.

As described above, according to the present invention, a memory means for storing graphics data representing images and transparency data defining transparency of the images is provided, the graphics data is read out in a subcode signal format from the memory means according to the fade command and sent to a decoding means, and with this operation a graphics video signal is generated. On the other hand, the transparency data is read out from the storage means according to the fade command, the transparency data value is gradually changed from a specified value in one direction, and the video signal input from the outside and the graphics video signal output from the decoding means are mixed at a mixing ratio corresponding to the transparency data. In an image based on the mixed video signal, a moving picture image based on the video signal input from outside can gradually be faded out with a graphics image gradually faded in, or on the contrary the moving picture can be made clearer with the graphics image gradually faded out.

Also, if the present invention is applied to a Karaoke system (as described above), the display image by the CRT display screen can automatically and gradually be shifted from graphics images to the moving picture images when playing of a music piece is started, and also the screen can automatically and gradually be shifted from the moving picture images to the graphics images when play of the music piece comes to the end.

What is claimed is:

1. A subcode graphics reproduction control apparatus generating a graphics video signal from subcode a signal obtained through playing of a recording medium, mixing said graphics video signal with a video signal input from outside, and sending the mixed signal to a image display unit, the apparatus comprising;

a command generating means for generating a fade command;

a storing means for storing graphics data representing images and transparency data defining transparency of said images;

a first reading means for reading said graphics data in a subcode signal format from said storing means according to said fade command;

a second reading means for reading said transparency data from said storing means according to said fade command and changing a transparency data value from a predetermined value in one direction and outputting said transparency data value;

a decoding means for generating a graphics video signal according to said graphics data read out in said subcode signal format; and a mixing means for mixing said video signal input from outside with said graphics video signal output from said decoding means at a mixing ratio corresponding to said transparency data output from the second reading means.

2. A subcode graphics reproduction control apparatus of claim 1, wherein said command generating means generates fade commands according to a subcode signal obtained through playing of said recording medium.

* * * * *